United States Patent
Irmler et al.

(10) Patent No.: US 9,656,392 B2
(45) Date of Patent: May 23, 2017

(54) SYSTEM FOR CONTROLLING ROBOTIC CHARACTERS TO ENHANCE PHOTOGRAPHIC RESULTS

(75) Inventors: Holger Irmler, Los Angeles, CA (US); Asa Kalama, South Pasadena, CA (US)

(73) Assignee: Disney Enterprises, Inc., Burbank, CA (US)

(*) Notice: Subject to any disclaimer, the term of this patent is extended or adjusted under 35 U.S.C. 154(b) by 1495 days.

(21) Appl. No.: 13/236,983

(22) Filed: Sep. 20, 2011

(65) Prior Publication Data

US 2013/0073087 A1 Mar. 21, 2013

(51) Int. Cl.
*B25J 11/00* (2006.01)
*G03B 15/08* (2006.01)

(52) U.S. Cl.
CPC ........... *B25J 11/0015* (2013.01); *G03B 15/08* (2013.01)

(58) Field of Classification Search
CPC .......... A63H 3/48; A63H 11/00; A63H 30/04; H04N 1/00127; H04N 1/00137; H04N 1/00164; B25J 11/0015; G03B 15/08
USPC ........... 700/245, 258, 259; 901/47; 382/291, 382/292, 293, 153; 348/64, 142, 211.6
See application file for complete search history.

(56) References Cited

U.S. PATENT DOCUMENTS

| | | | |
|---|---|---|---|
| 3,849,931 A * | 11/1974 | Gulley, Jr. | 446/175 |
| 5,407,151 A * | 4/1995 | Singhal | 244/76 R |
| 5,847,854 A * | 12/1998 | Benson, Jr. | 398/111 |
| 6,012,957 A * | 1/2000 | Cyrus et al. | 446/175 |
| 6,225,615 B1 * | 5/2001 | Yang | 250/206 |
| 6,244,260 B1 * | 6/2001 | Ragoza et al. | 124/34 |
| 6,364,735 B1 * | 4/2002 | Bristow et al. | 446/397 |
| 6,684,130 B2 * | 1/2004 | Ogure et al. | 700/245 |
| 6,733,360 B2 * | 5/2004 | Dooley et al. | 446/454 |
| 6,736,694 B2 * | 5/2004 | Hornsby et al. | 446/356 |
| 7,147,535 B2 * | 12/2006 | Simeray | 446/175 |
| 7,162,338 B2 * | 1/2007 | Goncalves et al. | 701/23 |
| 7,200,260 B1 * | 4/2007 | Watanabe et al. | 382/153 |
| 7,236,630 B2 * | 6/2007 | Sato et al. | 382/173 |
| 7,395,126 B2 * | 7/2008 | Decker | 700/65 |
| 7,720,554 B2 * | 5/2010 | DiBernardo et al. | 700/56 |
| 7,744,441 B2 * | 6/2010 | Sosnovskiy | 446/175 |
| 7,756,322 B2 * | 7/2010 | Saitou et al. | 382/153 |
| 7,760,908 B2 * | 7/2010 | Curtner et al. | 382/103 |

(Continued)

*Primary Examiner* — Thomas G Black
*Assistant Examiner* — Sze-Hon Kong
(74) *Attorney, Agent, or Firm* — Marsh Fishmann & Breyfogle LLP; Kent A. Lembke (57) ABSTRACT

A method for controlling a robotic apparatus to produce desirable photographic results. The method includes, with a motor controller, first operating a robotics assembly to animate the robotic apparatus and, then, detecting an upcoming image capture. The method further includes, with the motor controller in response to the detecting of the upcoming image capture, second operating the robotics assembly to pose the robotic apparatus for the upcoming image capture. In some embodiments, the detecting includes a sensor mounted on the robotic apparatus sensing a pre-flash of light from a red-eye effect reduction mechanism of a camera. In other cases, the detecting includes a sensor mounted on the robotics apparatus sensing a range finder signal from a range finder of a camera. The posing may include opening eyes, moving a mouth into a smile, or otherwise striking a pose that is held temporarily to facilitate image capture with a camera.

21 Claims, 7 Drawing Sheets

(56) References Cited

U.S. PATENT DOCUMENTS

| | | |
|---|---|---|
| 7,783,382 B2 * | 8/2010 | Huang et al. ............... 700/245 |
| 8,378,881 B2 * | 2/2013 | LeMire et al. ............... 342/63 |
| 8,380,350 B2 * | 2/2013 | Ozick et al. ............... 700/253 |
| 8,392,023 B2 * | 3/2013 | Duchaine et al. ............ 700/260 |
| 8,417,384 B2 * | 4/2013 | Togawa et al. ............ 700/258 |
| 8,706,298 B2 * | 4/2014 | Goulding ............... 700/251 |
| 8,731,276 B2 * | 5/2014 | Mizutani et al. ............ 382/153 |
| 2002/0081937 A1 * | 6/2002 | Yamada et al. ............ 446/175 |
| 2003/0170602 A1 * | 9/2003 | Hagita et al. ............ 434/307 R |
| 2007/0128979 A1 * | 6/2007 | Shackelford et al. ........ 446/484 |
| 2007/0191986 A1 * | 8/2007 | Van Breemen ............ 700/245 |
| 2007/0270074 A1 * | 11/2007 | Aochi et al. ............... 446/175 |
| 2009/0043422 A1 * | 2/2009 | Lee et al. ............... 700/245 |
| 2009/0298603 A1 * | 12/2009 | Crawford ............... 472/137 |
| 2010/0033571 A1 * | 2/2010 | Fujita et al. ............ 348/149 |
| 2010/0167625 A1 * | 7/2010 | Conway ............... 446/454 |
| 2010/0268383 A1 * | 10/2010 | Wang et al. ............... 700/248 |
| 2011/0245974 A1 * | 10/2011 | Kawamoto et al. ......... 700/259 |
| 2012/0072023 A1 * | 3/2012 | Ota ............... 700/259 |
| 2012/0185090 A1 * | 7/2012 | Sanchez et al. ............ 700/253 |
| 2013/0245937 A1 * | 9/2013 | DiBernardo et al. ........ 701/514 |
| 2014/0039680 A1 * | 2/2014 | Angle et al. ............... 700/259 |
| 2014/0062706 A1 * | 3/2014 | Frazier ............... 340/632 |

* cited by examiner

SYSTEM FOR CONTROLLING ROBOTIC CHARACTERS TO ENHANCE PHOTOGRAPHIC RESULTS

BACKGROUND

1. Field of the Description

The present description relates, in general, to robots and costumes with robotic portions that can be animated or articulated while worn such as character heads with a mouth and eyes that can be articulated or moved via robotics or similar drive systems or assemblies, and, more particularly, to systems and methods for controlling robots or robotic assemblies, such as those used to provide facial animation of a worn character head, so as to allow photographers (i.e., nearly any viewer with a camera) to capture improved photographs of the robots and robotic characters.

2. Relevant Background

Actors, performers, or puppeteers wear costumes when they perform as a character such as in a live show, in a parade, in interactive entertainment settings, and in venues that call for a character to walk among and nearby audience members or guests. For example, costumes may include character heads that a performer wears on top of or covering their own head, and such character heads have been designed to allow motion of costume features such as to allow moving the mouth to move in synchronization to an audio output or the performer's voice. In other cases, the eyes may be moved or articulated and/or the eyelids may be opened and closed, and other features may also be moved such as expressive eyebrow movement. Such animation of the costume features and, particularly, of the head or face has been well received by audiences as the articulation or movement helps to bring the character to life and enhances the entertainment experience of the audience members or guests.

In a typical articulated character head, the mouth and eye motions may be provided with motorized motions. A performer may wear sensors on their fingers and their finger movements provide inputs or control signals (e.g., analog input signals) that cause a radio or remote controlled (RC) servo or any other driver (e.g., an AC or DC motor, a pneumatic driver, a hydraulic actuator, an artificial muscle device, and so on) to move the portions of the costume such as to open and close a character's mouth or eyes when the performer moves their fingers. In addition to control by the performer, RC controllers with joysticks, switches, and knobs similar or equivalent to the controllers used to control hobby cars and planes may be used to remotely control or operate the RC servos so as to allow someone offstage or "wayside" to wirelessly control facial movements or move other costume features by providing real time or live control signals. In many cases, facial movements including those of the mouth and eyes may be achieved with a facial motor controller that operates the one or more drives such as servo motors to animate the face or other features of the character head (or body, in some cases), and the facial motor controller may receive signals from a control program run locally and/or remotely by a microcontroller or computer.

In other cases, robots or robotic-operated characters are used in many entertainment venues, without requiring a human operator or actor to wear the robotics. These robots or robotic characters may be animated, similar to a character head worn by an actor or performer, to entertain an audience or guests of an entertainment facility. For example, one or more robots or robotic characters may entertain audiences with their movements being scripted or initiated by a controller or computer running a show software program to selectively operate a facial or other controller. A well-known example of such a use of robots is on a stage of a family restaurant or along a path of an amusement park ride that has slower moving portions or show portions.

The use of robots and characters with robotic portions such as faces has been well-received in many entertainment applications. Viewers especially are attracted to the animation or movements of the eyes, mouth, heads, hands, arms, and other elements of these robots and robotic characters that make them come alive, allow them to interact with the viewers or audiences, and give them human-like characteristics including a unique personality.

More than ever, audiences and visitors to entertainment facilities carry a camera and a large part of the entertainment is capturing photographs (e.g., pictures or digital images) of their entire experience. This includes their viewing of, and personal interaction with, robots and robotic characters. However, capturing a quality photograph can be a challenge in many cases due to the animation or movements that make these robots and characters so entertaining. As one example, a robot may be moving his head or arms quickly as part of a show or act, and photographs taken of the moving robot may be blurred due to the movement or the robot may simply have moved into a pose or position that is not as desirable to the photographer. In another example, a character head worn by a performer or a robot head may have the ability to blink its eyes, and, as with photographs of people, a photographer may operate a camera to capture an image during mid or full blink such that the photo opportunity produces a photograph in which the character's eyes are partially or fully closed. Often, the poor photographic results are not noticed until later or the opportunity is only available for a very short time such as during a ride or when there is a queue of others waiting for their photo opportunity with a character, which limits the photographer's ability to capture more photographs or do a retake.

Hence, there remains a need for improved methods and systems for obtaining quality photographs of robots and robotic characters (e.g., any mechanized object that is driven, moved, or animated by motor controllers or the like).

SUMMARY

The present invention addresses the above problems by providing methods and systems for providing enhanced control over the movement or articulation of driven output devices provided in articulated heads, costumes, and associated props (e.g., wearable costume features) or in robots or animatronic devices, and these controlled objects may be labeled more broadly as robots or robotic assemblies (or apparatus with robotic assemblies). The driven output devices or portions of the robotic assemblies may include a driver/actuator such as radio-controlled (RC) servos or other servos, electromechanical actuators, an AC or DC motor, a pneumatic driver, a hydraulic actuator, an artificial muscle device, and/or the like driving character eyes, mouths, and so on to animate a portion of a costume or even include the robotics that turn a head, move an arm and hand, or the like. The controlled robotics assemblies generally include a performer-worn costume with a robotic head or other body parts or props but may also include robotic devices that entertain guests such as along a ride path, on a parade float, in a shop window or other set/display, and so on.

The inventors recognized that enhanced robotic abilities are desirable for enhancing the human-like characteristics or realistic aspects of robotics-based characters, and these abilities include actions like moving a mouth such as to speak or make expressions and to blink eyelids open and shut. While this makes the robotics-based character more life-like, it also increases the chances that photographic opportunities ("photo ops") produce less desirable results including photographs with the character's eyes closed or partially closed as when taking pictures of people, and the mouth may be in an odd position such as partially open or in what appears to be a snarl when the character is desired to be friendly and smiling (or vice versa for a more villainous character). Hence, the inventors determined it would be desirable to cause the robotics to be controlled to be posed for photographers or for photo ops such as with a character's eyes open, and their mouth arranged in a smile or suiting another expression or with a robot "striking a pose" for the camera.

Briefly, the robotics control system is modified to include a device for detecting when a photograph is about to be taken of a robot or character/object, and this may include a sensor for detecting when a camera has taken pre-image capture processes such as a pre-flash to control the red-eye effect or transmission of a beam of light to pertain' a range finder operation. The detector device may signal a motor controller of the robotics assembly directly to cause the motor controller to freeze in place, e.g., cause a facial motor controller to interrupt a current facial animation, and, in some cases, additional control operations may be performed to adjust the pose for an improved photographic result, e.g., cause the facial motor controller to open the character's eyes or to cause the character to smile.

The detector device may also provide the signal to a microcontroller/processor that runs a photography enhancement module or similar software to access memory to select a pose for use in a photo op upon detection of the presence of a camera (e.g., through object recognition or a signal from a camera operator) or upon detection of a pre-image camera operation. The pose may be selected from sets of still or moving animations (or poses), and it may be transmitted to one or more motor controllers of the robotics assembly to cause a pose to be taken and held for a short time period (1 to 5 seconds or the like) to allow the photographer to capture a high quality image. In the example of a facial motor controller, the selected pose or photo animation may provide instructions or commands that cause the motor controller to operate the robotics assembly to execute a particular camera-friendly facial expression.

More particularly, a method is provided for controlling a robotic apparatus in a way that produces more desirable photographic results such as ones placing a robotic apparatus (such as a face of a robotic character head) in a camera-friendly pose. The method includes, with a motor controller, first operating a robotics assembly to animate the robotic apparatus and, then, detecting an upcoming image capture. The method further includes, with the motor controller in response to the detecting of the upcoming image capture, second operating the robotics assembly to pose the robotic apparatus for the upcoming image capture.

In some embodiments of the method, the detecting includes a sensor mounted on the robotic apparatus sensing a pre-flash of light from a red-eye effect reduction mechanism of a camera. In other cases, though, the detecting includes a sensor mounted on the robotics apparatus sensing a range finder signal from a range finder of a camera. While in still other cases, the detecting includes capturing images of objects proximate to the robotic apparatus, processing the captured images with an object recognition module run by a processor to identify a camera, and, in response to the identification of the camera, generating a control signal with the processor initiating the second operating by the motor controller. In yet other cases or implementations, the detecting includes receiving with a wireless communication receiver provided on the robotic apparatus a wireless signal indicating the upcoming image capture by a camera.

In the method, the second operating may include interrupting the animation of the robotic apparatus to generate the pose (e.g., freeze the robotic apparatus such as a wearable character head in place temporarily). In such cases, the second operating may further include operating the robotics assembly to adjust at least one element of the robotic apparatus. For example, the at least one element of the robotic apparatus may be an eye, and the operating to adjust the at least one element includes opening the eye (e.g., determine if the interruption of animation results in closed eyes or an undesirable pose and, if so, taking steps (e,g., smaller changes) to improve or correct the pose for a photo op).

The second operating step may also include executing a photograph animation that differs from an animation used in the first operating so as to generate the pose for the upcoming image capture. For example, the robotic apparatus may include a face, and the motor controller may include or be a facial motor controller operable to animate eyes and move a mouth of the face. In operations, the second operating may then include operating the facial motor controller to move the eyes and/or the mouth to modify the facial expression or pose of the robotic apparatus prior to the upcoming image capture.

DETAILED DESCRIPTION OF THE PREFERRED EMBODIMENTS

Briefly, embodiments of the present invention are directed to methods and systems for providing enhanced control over the movements of movable or driven portions of a worn character costume or props associated with such a costume and of robots and robotic objects. Particularly, the systems provide a sensor sensing when a picture or photograph is about to be taken such as by identifying that a camera is proximate to a robotic character and is being operated in pre-image capture mode (e.g., a pre-flash has occurred or range finding has begun).

The system includes controllers that operate in response to cause the robotics assembly to operate to place the robot or robotic character in a camera-friendly pose. This may include simply interrupting a current animation or it may involve causing the robotics assembly to execute a photo animation to achieve a desired pose. For example, a robot may be caused to turn its head toward the camera and place their hands on their hips while a robotic character head may be operated to open its eyes, close its mouth and even smile (or frown), and so on to achieve a desired facial expression.

A number of techniques may be used to determine when image capture is about to happen and the following discussion describes several useful approaches. Similarly, the steps and processes taken to control the robotics assembly after detecting an upcoming image capture may be varied to achieve good photographic results, and the following paragraphs describe a variety of control techniques/systems and methods that may be used to improve photography of robots and robotic characters.

Figure 1:
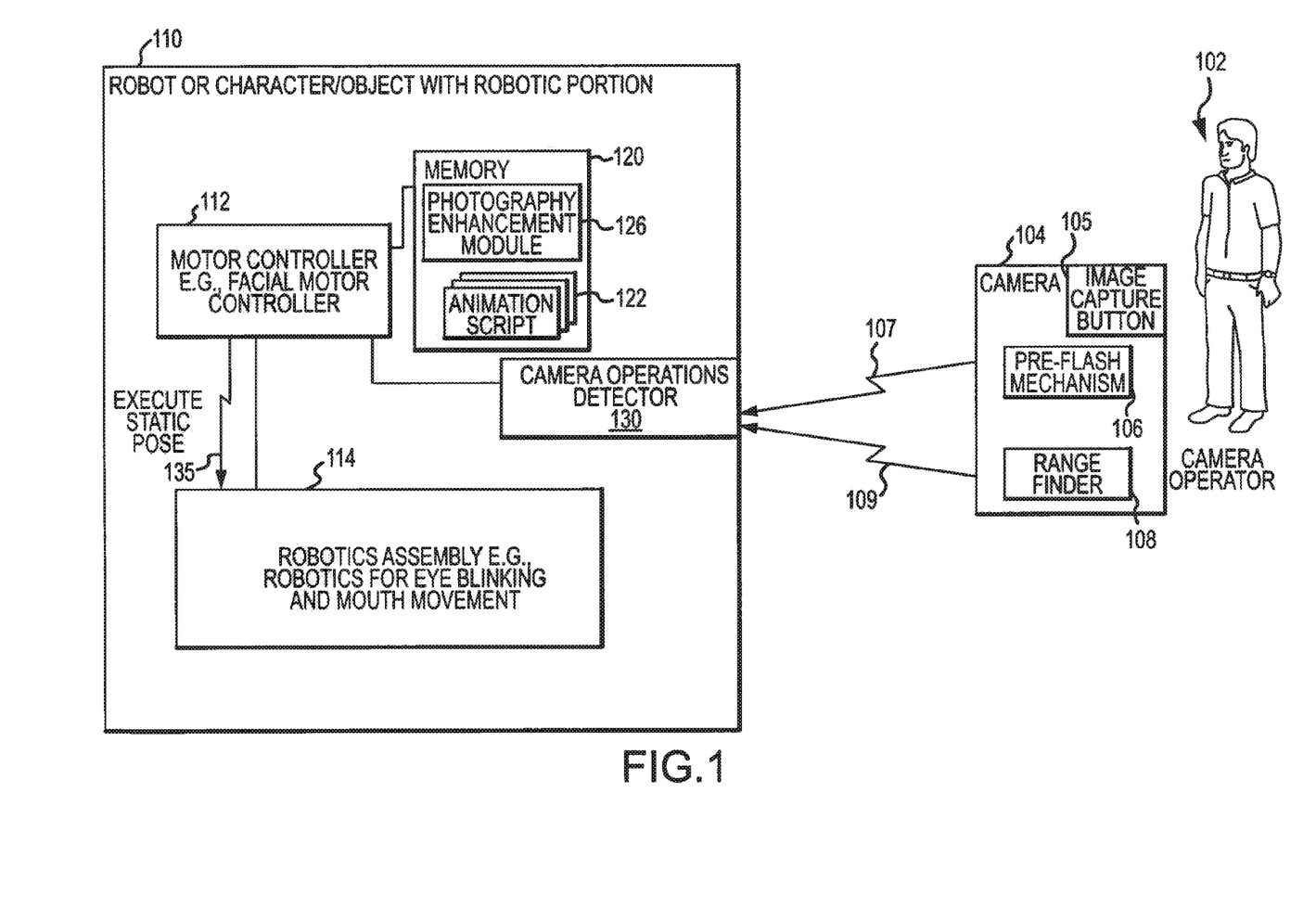
FIG. 1 is a functional block diagram of a robot or object such as a character with a portion that is robotic adapted for control to enhance photography result obtained by a viewer (shown as a camera operator in the figure)

FIG. 1 illustrates a functional block diagram that includes a robot or character/object with a robotic portion 110. A viewer or camera operator 102 is shown to be nearby the robot/robotic character 110, and the operator 102 is in the process of taking a picture (performing image capture) with a camera 104. As shown, the camera 104 may include an image capture button 105 that when pressed fully by the operator 102 causes an image of the robot/robotic character 110 to be digitally captured or captured on film media.

The camera 104 may include devices that enhance this image capture process. For example, the camera 104 may include a pre-flash mechanism (or red-eye reduction device) 106 to control the red-eye effect by providing a smaller flash 107 when the image capture button 105 is pressed (e.g., fully or partially in some cases). In some cases, a series of short, low-power flashes, or a continuous piercing bright light 107 is generated by the pre-flash mechanism 106 preceding a main flash of the camera 104 to trigger a pupil of a target's eye to contract. Additionally or separately, the camera 104 may include a range finder or other device 108 useful for measuring, prior to image capture, subject or target distance automatically using electro-optical techniques, and, to this end, the range finder 108 is shown to emit a beam(s) of light 109 (such as a beam of infrared or laser light) that is used to determine the distance of the subject (robot 110) such as through use of timing when a reflection of the beam 109 is received at the range finder 108 or camera 104.

The robot or robotic character/object 110 includes a robotics assembly 114 that allows it to move or be animated. For example, the robot 110 may have a head and be able to turn it upon a neck and include a face with eyes that can be blinked and a mouth that can move via operation of the robotics assembly 114. One or more motor controllers 112 is provided for controlling operations of the robotics assembly 114 and its components. For example, the apparatus 110 may be a character head worn by a performer, and the motor controller 112 may be a facial motor controller that selectively operates robotics 114 to execute eye blinking and mouth movement. To this end, the motor controller 112 may access memory 120 to retrieve animation scripts or subroutines 122 that it uses to cause the robotics assembly 114 to execute various animations such as to sing along with a playing song, to provide lip synchronization and matching facial expressions with a performer's speech, and so on.

The camera operator 102 may be observing the robot/robotic character 110 as it is moving or animated with its operating robotics assembly 114 and decide to press the image capture button 105 to capture an image, but, as discussed above, the robot/robotics character may be in the middle of an animation or scripted movement 122 such that the captured image may be less desirable. For example, the robot 110 may turn its head via robotics assembly 114 immediately prior to capture of an image with camera 104 or the character head 110 may be operated via robotics assembly 114 to close its eyes or blink right when the camera 104 operates to capture the image of the robot/character head 110.

To provide improved photographic results, the motor controller 112 is operable such as via a photography enhancement module 126 to modify operations of the robotics assembly 114 based on the presence of the camera 104 and operation by camera operator 102 of the camera 104. The photography enhancement module 126 may take the form of hardware, software, and/or firmware (or a combination thereof), and it may be provided in memory 120 and be executable code/software programs that are provided in non-transitory computer readable media to cause the motor controller 112 to perform particular functions (such as the functions/method or portions of such a method shown in FIG. 2).

Particularly, the robot or robotics character/object 110 is shown to include a camera operations detector 130 that operates to sense when light or light beams (or signals) 107 and/or 109 strike or are received at the robot/character 110 and, in response, provide a signal to the motor controller 112. The motor controller 112 may use the photography enhancement module 126 or otherwise act in response to this signal from the detector 130 to determine that a pre-image capture operation is occurring, e.g., a camera is targeting the robot/character 110 as a subject of a photograph. In response, the motor controller 112 may cause the robotics assembly to execute a static pose 135 to allow a quality image to be captured by the camera 104.

The camera operations detector 130 may take the form of a sensor adapted for detecting pre-flashes 107 from a pre-flash mechanism 106 such as a sensor in the form of a phototransistor or a camera. In other cases, the detector 130 may take the form of a sensor adapted for detecting range finder signals/beams 109 from a range finder 108, and, again, the sensor may take the form of a phototransistor, a camera, or the like. In some embodiments of the robot/robotic character 110, the camera operations detector 130 is configured to detect both pre-flash and range finder operations and may include one or more sensors for receiving/detecting beams/signals 107, 109 and, in response, transmitting detection signals to the motor controller 112 indicative of an upcoming or imminent image capture of the robot 110.

Figure 2:
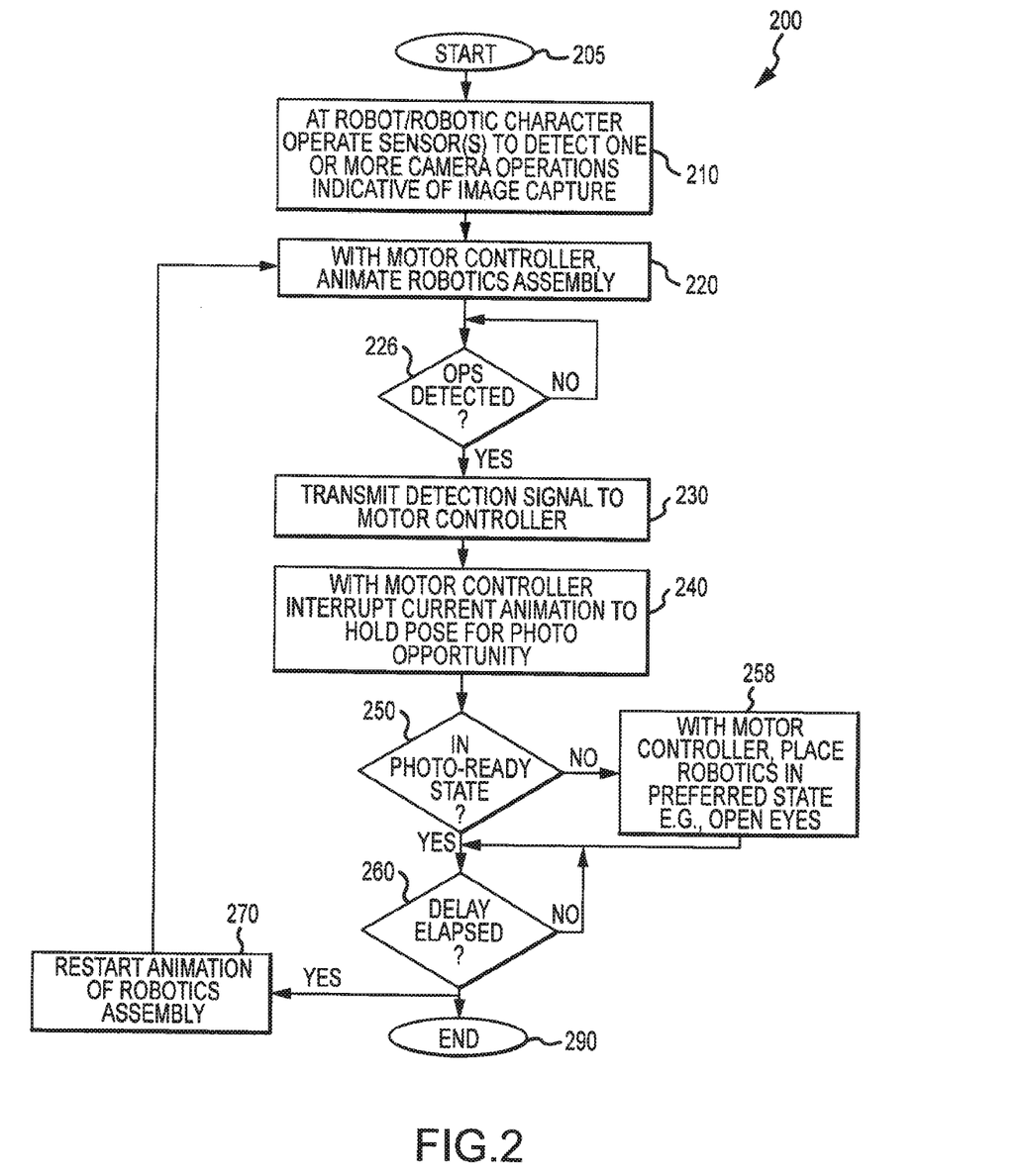
FIG. 2 illustrates a flow diagram of a method of controlling a robot or robotic assembly to enhance photography results for that robot/robotic assembly such as may be implemented through operation of the robot/robotic character of FIG. 1.

FIG. 2 illustrates a control method for a robotics assembly to enhance photography of a robot or robotic character/object including such a robotics assembly, and this method 200 may be implemented by operation of the robot 110 of FIG. 1. As shown, the method 200 starts at 205 such as with providing a camera operations detector 130 on the robot/character 110 such as on or near a location of all or a portion of the robotics assembly 114 (e.g., on or near the face or head of a robotic character). The starting step 205 may also include modifying or providing a motor controller 112 operable to respond to signals from the detector 130 to control the robotics assembly 114 to improve photo ops such as with use of photography enhancement module 126 or direct modifications to controller 112.

The method 200 continues at 210 with operating the camera operations detector or sensor(s) 130 to detect one or more camera operations 107, 109 indicative of upcoming image capture by a camera 104. This may include determining that a pre-flash operation is occurring with light flash(es) 107 to control red-eye effects or that range finder 108 is determining a distance between the robot 110 and the camera 104 with beams/signals 109. The method continues at 220 with the motor controller 112 acting to animate the robotics assembly 114 such as to execute one or more animations per animation scripts 122 (note, step 220 may also occur before or concurrently with step 210). At step 226, the method 200 includes determining with the motor controller 112 (or software 126) whether a camera operation has been detected, and, if not, continuing to operate the sensor 130 to await a beam 107 or 109 being received/sensed. If operations are detected at 226, the method 200 continues at 230 with a detection signal being sent to the motor controller 112.

Then, the method 200 includes the motor controller 112 acting to interrupt the current animation at 240 so that the robotics assembly 114 freezes or holds its current pose (e.g., executes a static pose as shown at 135). In some cases, this pose is held for a delay period or photo op length of time (such as 1 to 5 seconds or the like) and steps 250 and 258 are skipped. However, in some embodiments, the method 200 first includes determining whether the held pose or frozen current animation state is one that is desired or useful for photo ops (e.g., does the current state of the robotics assembly 114 place the robot or character in a photo-ready state?).

For example, it may be a default that the photo-ready state includes eyes being opened or a head of a robot turned to face the camera 104 or some other position of the robotics assembly 114 (e.g., a smile on a character's face or some other present facial expression). If the enhancement module 126 and/or motor controller 112 determines at 250 that the robot/character 110 is not in a photo-ready state at 250, the method 200 may continue with executing another animation at 258 with the robotics assembly 114 to achieve a desired state, e.g., hold a pose and open blinked shut eyes, hold a pose/expression and turn head, hold interrupted animation and move mouth drivers to achieve a smile, and the like.

The method 200 then continues at 260 with determining whether a photo op delay or image capture time period has lapsed, and, if not, the motor controller 112 continues to operate the robotics assembly 114 to hold the existing pose. If yes at 260, the method 200 continues at 270 with restarting the current animation script 122 and repeating other method steps beginning at 220. The method 200 may also end at this point at 290 or at any other time the method 200 may be terminated at 290 as appropriate with use of the robot/character 110.

Figure 3:
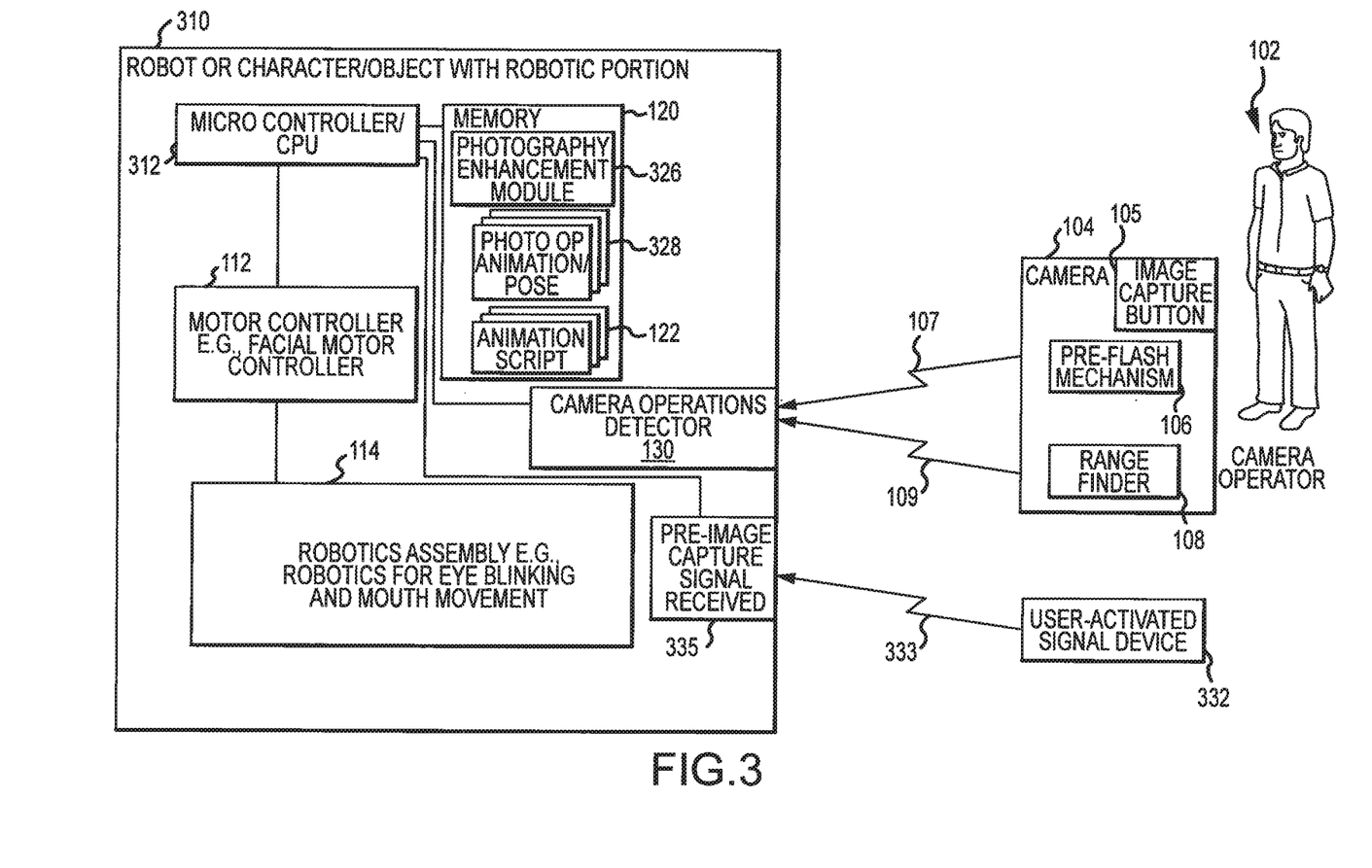
FIG. 3 is a functional block diagram similar to that of FIG. 1 showing another embodiment of a robot or robotic object/character operating to select and provide animations/poses to a motor controller to enhance photographic results.

Other control system configurations or components may be used to improve operations of robotics assemblies to improve photographic results. For example, FIG. 3 illustrates a robot or character/object with a robotic portion 310 that is similar to that of the robot 110 of FIG. 1 with some modifications and that may be operated differently as discussed with reference to FIGS. 4 and 5. Hence, like components or items are provided similar numbering and are not discussed again in detail at this point.

The robot 310 differs from that of robot 110 in that a microcontroller/processor/computer 312 is provided to manage memory 120 and to manage operation of the motor controller 112, which continues to control the robotics assembly 114. The microcontroller 312 may execute a photography enhancement module 326 and also may access memory 120 to retrieve stored photo op animations or poses 328 that define one to many differing poses or still/motion animations that may be carried out by robotics assembly 114 when a camera 104 is detected.

Further, robot 310 differs in that it may include a pre-image capture signal receiver or wireless/wired communication device 335. In use, for example, the device 335 may be a wireless receiver for receiving signals 333 from a user-activated signal device 332 operated automatically when the button 105 is depressed or by an operator 102 of the camera 104 (with the operator being a human in some cases or being a computer/electronic camera triggering device). In some cases, the signal device 332 may communicate via Bluetooth™ or similar communication protocols (or wireless technology standards) to the receiver 335, which, in turn, signals the microcontroller 312 that a camera 104 is about to be operated to capture an image of the robot 310. For example, the camera 104 may be used to take numerous photographs of visitors of an entertainment facility with some of these including robot/robotic characters 310 with the visitors, and it may be useful to actively signal the robot controller 312 via receiver 335 that a photo op is imminent to allow the robot to proactively execute camera-friendly animation or "strike a pose."

Figure 4:
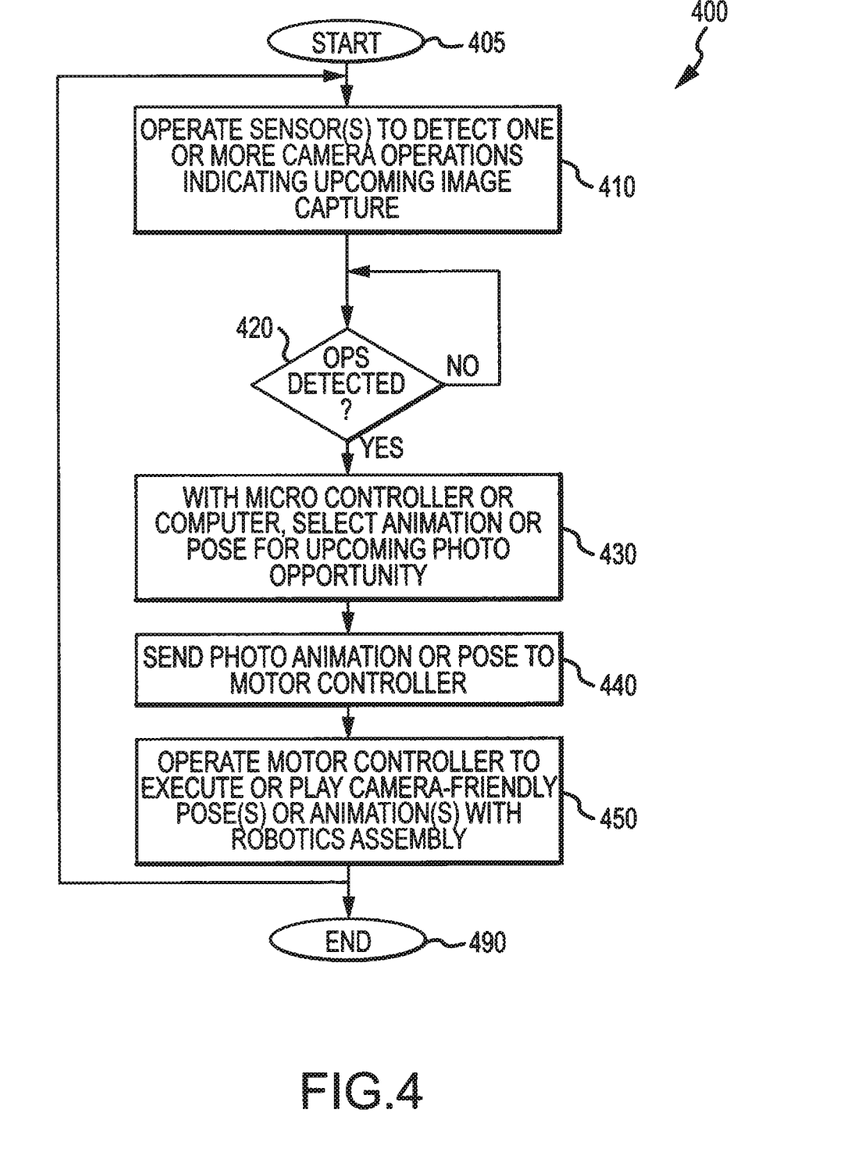
FIG. 4 illustrates a flow diagram of a method of controlling a robot or robotic assembly, such as that shown in FIG. 3, to selectively animate or pose a robot or robotics portion of an object/character in response to detection of pre-image capturing operations.

With these modifications of robot 310 relative to robot 110 in mind, FIG. 4 illustrates a method 400 for operating the robotics assembly 114 to enhance or at least control photographic results achieved with the robot 310. The method 400 starts at 405 such as with modifying a robot/robotic character to include the microcontroller 312 adapted to execute the photography enhancement module 326 and to manage memory 120 to select and retrieve one of the photo op animations/poses 328 and provide this to motor controller 112 for execution by robotics assembly 114. At 410, the method 400 includes operating one or more sensors to detect one or more camera operations indicating an upcoming image capture. At 420, the photography enhancement module 326 run by the microcontroller 312 acts to determine if a signal has been received indicating whether a camera ops is detected, and, if not, continuing to operate the sensors. If yes at 420, the method continues at 430.

As shown in FIG. 3, the "sensors" of step 410 may include camera operations detector(s) 130, which as discussed with reference to FIG. 1, may include a photo transistor, camera, or the like that is adapted to detect pre-flashes 107 from a pre-flash mechanism 106 and/or beams/signals 109 from a range finder 109. Either or both may trigger the detector 130 to produce a signal to the microcontroller 312, which recognizes via software 326 that an image capture may occur within the next few seconds. At 430, the method 400 continues with the microcontroller 312 using the enhancement module 326 to select an animation or pose from stored set 328 for use in the upcoming photo op.

At 440, the chosen photo animation or pose 328 is sent to the motor controller 112 by the microcontroller 312. At 450, the motor controller 112 causes the robotics assembly 114 to execute or play the camera-friendly pose or animation, e.g., robotics used to operate eyes would be opened, a mouth may take on a particular expression, and so on. This animation may or may not be related to the currently executing animation such that this step 450 differs from the freezing or interruption process of the method 200 in FIG. 2. For example, a robot may be performing one ongoing animation, and, with the detection of a camera operation at 420, the robot via its robotics may take on a very different pose or animation so as to strike a pose or ham-it-up for the camera and its audience (e.g., stop other animations, turn portions to the camera, and make a face or change facial expression for a photo op such as to smile, to frown, to stick out a tongue, to wink one eye, and so on with the particular poses and/or animations being nearly limitless). The method 400 may continue at 410 or end at 490.

Figure 5:
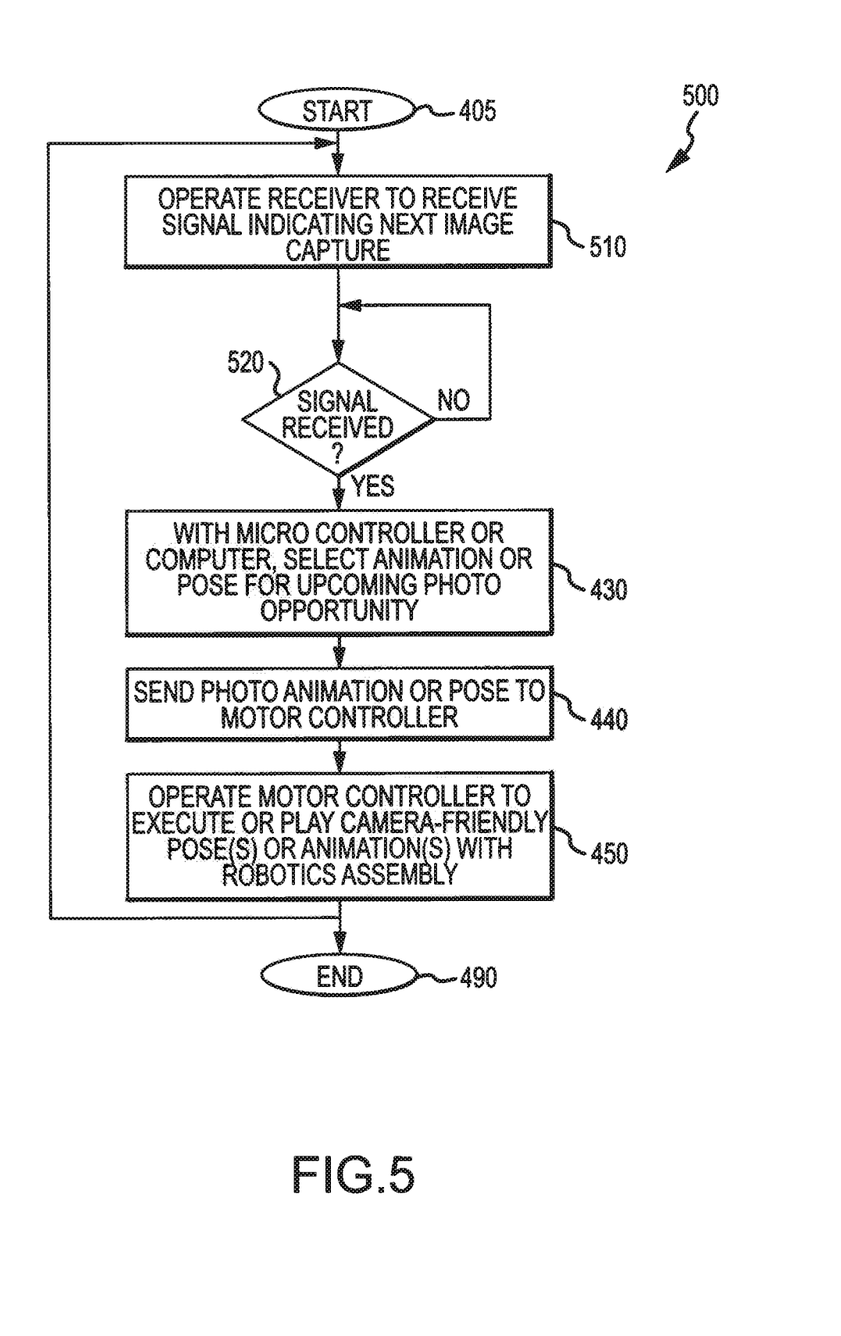
FIG. 5 illustrates a flow diagram of another method of controlling a robot or robotic assembly, such as that shown in FIG. 3, to selectively animate or pose a robot or robotics portion of an object/character in response to receiving or sensing an image capture signal (or alert/warning signal) from camera operator (human or automated operator)

The robot/character 310 of FIG. 3 may be operated differently to enhance photographic results as shown with the method 500 of FIG. 5. The method 500 includes steps similar to those of method 400 including the starting step 405, the selecting of an animation or pose for a photo op 430, the sending 440 of the chosen photo animation to the motor controller, and the operating 450 of the motor controller to strike or produce the pose for a photographer. These steps may be implemented as discussed above for method 400.

The control method 500 differs in that after the start at 405 the method 500 includes operating the receiver 335 to receive signals indicating a next image capture as shown at 510. When a signal is determined to be received at 520 by a microcontroller after it receives a receipt signal from the receiver 335, the method 500 continues with step 430 and selecting the animation or pose for an upcoming image capture. Steps 510 and 520 may include a sensor 335 such as a Bluetooth™-enabled device receiving a signal 333 from a user/computer-activated signal device 332, and the device 332 may be associated by a user 102 or a controller (not shown) with the camera 104. During operation, the device 332 may act to send the signal 333 a predefined time period prior to triggering image capture via button 105 (or otherwise when the camera is electronically controller with an automated controller).

Figure 6:
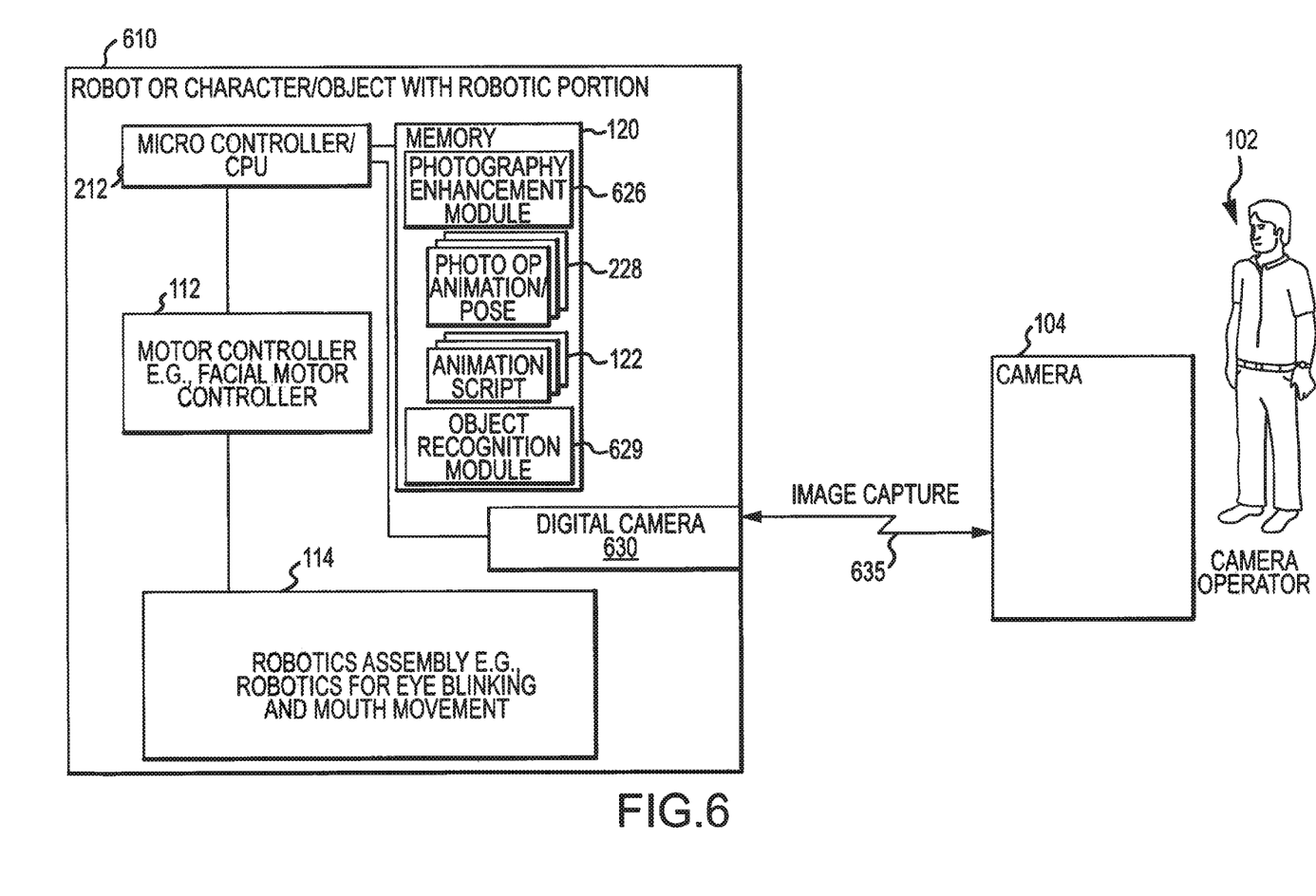
FIG. 6 illustrates a functional block diagram similar to that of FIGS. 1 and 3 showing an additional embodiment of a robot or robotic object/character operable to select and provide animations/poses to a motor controller based on detection of a camera using object recognition.

FIG. 6 illustrates another embodiment of a robot or character/object 610 with a robot portion that is adapted to provide enhanced photographic results of the robot/character 610. Again, many components are repeated from robot 110 and these are given like numbers and prior descriptions of these components are applicable and not repeated at this point in the description. In some applications, the inventors recognized that a camera 104 may not have a range finder and/or red-effect reduction/control mechanisms or detection of use of such components may not provide acceptable lead times to cause a robotics assembly 114 to execute a camera-friendly pose or animation.

Hence, the robot 610 of FIG. 6 is shown to include a digital camera 630 that receives and captures (at least temporarily) images viewable from a surface or side of the robot 610. For example, the robot or character may have a side or surface that is selected to be included in or to be more camera-friendly such as a face of a robotic character or a "front" side of a robotic object. A digital camera may have its receiving optics or lens facing in this direction, e.g., the camera may be mounted on a face (such as near the eyes) of a robotic character to "see" what the robotic character sees. More accurately, the camera 630 captures images 635 of items viewable from the robot mounting surface for the camera 630 (items to which the robot surface is exposed for viewing). These items include the camera 104 such that the captured images 635 include an image of the camera 104.

During operations, the camera 630 continuously (or periodically) feeds digital images including images 635 of camera 104 to the microcontroller/CPU 212. The microcontroller 212 acts to use its photography enhancement module 626 along with an object recognition module or software package 629 to process all images captures by the digital camera 630. When an object is identified as or matches an image of a camera by the recognition module 629, the microcontroller 212 may act as discussed above with enhancement module 626 to select a photo op animation or pose 228 and provide this to motor controller 112 for execution by robotics assembly 114.

Figure 7:
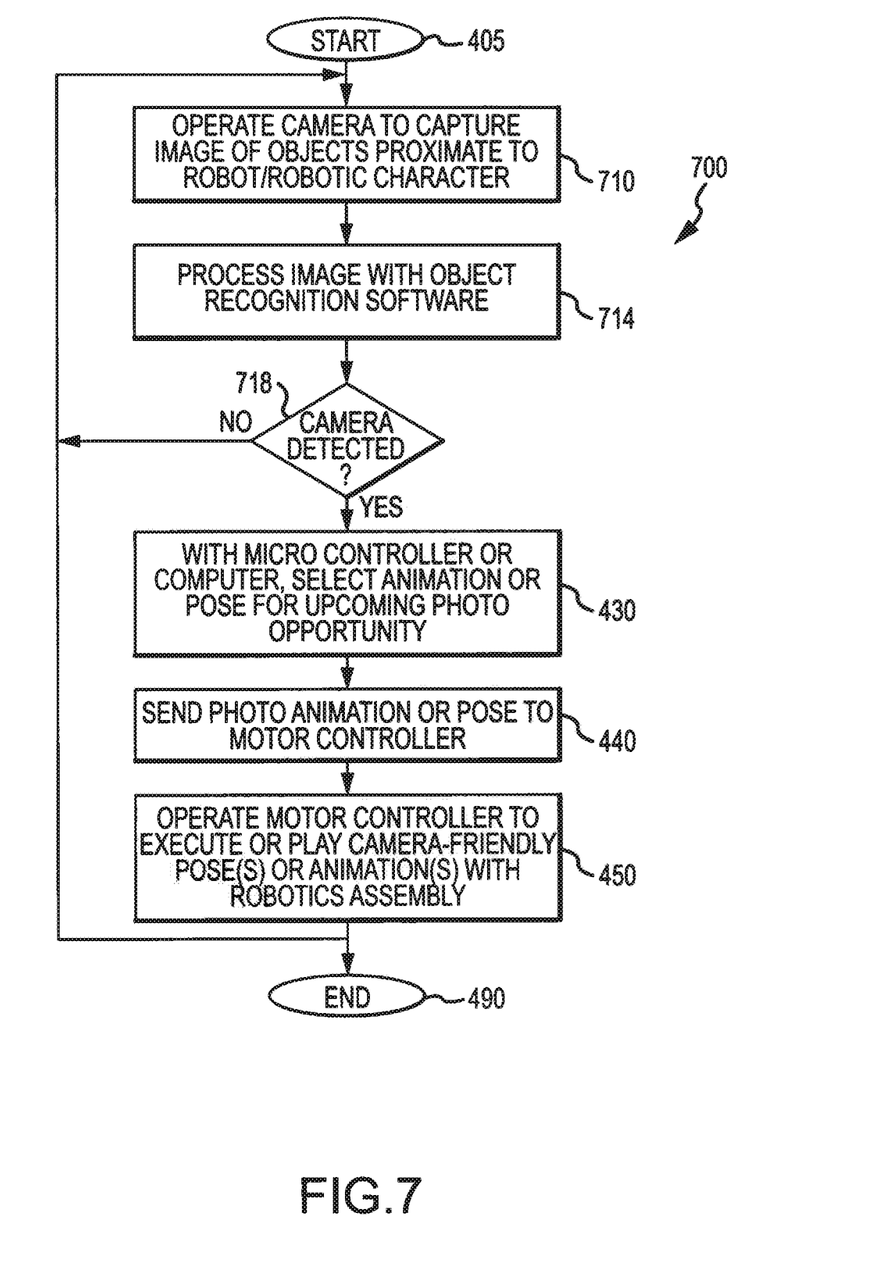
FIG. 7 illustrates a flow diagram of an additional technique for controlling a robot or robotic assembly, such as that shown in FIG. 6, for selectively operating the robot/robotic assembly to pose or be animated (a still animation or an moving animation) upon detection of a camera proximate to (or targeting/focusing on) the robot/robotic character.

Operation of the robot or robotic character 610 is described with the method 700 of FIG. 7. Again, steps that are similar to that of other methods such as method 400 are given like numbers and not described in detail here. The method 700 starts at 405, which may include installing the digital camera 630 for capturing images 635 in one or more directions relative to the robot 610 such as with a lens near the eyes of a robotic face to receive images of objects to which the face is exposed including camera 104. The method 700 continues at 710 with operating the digital camera 630 to capture a plurality of images of objects that are proximate to the robot 610 or at least in a viewing range of the camera lens. These images are passed to the microcontroller and processed using the object recognition software 629 at step 714 to determine whether the side of the object (such as the face of a robotic head) is facing or exposed to a camera 104. If no camera is detected at 718, the method 700 continues at 710. When a camera or cameras are detected, the method 700 continues at 430 with the microcontroller 212 selecting a photo animation or pose and sending it at 440 to the motor controller 112 (e.g., a facial motor controller) to execute at 450 the chosen pose/animation (e.g., to play camera-friendly facial expressions or the like). As discussed above, the animations or poses may be still or include motion and may be each be held (when stills) for a predetermined time period to allow identified cameras to take pictures (e.g., 1 to 3 seconds or more in some cases).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In some embodiments, the animation script (such as script 122) may be a selected still or animated set of computer graphics or CG animation, and the robotics assembly (such as assembly 114) may include a display device or monitor for displaying the selected CG animation. In other cases, a displayed CG animation may simply be frozen in a state or pose as discussed for the robotic assemblies with regard to eye blinking. Again, the displayed animation may be modified some amount to present an enhanced image for a photo op such as to open the eyes of a displayed animated character (or animated face) or to cause the character/face to smile or show another emotion. As a result, a display/monitor may be used in place of the displayed robotics assemblies or as part of such assemblies, and the response to a detected pre-image capture operation (or the presence of a camera) may be to pause a video or animation display or to select and present a still or video image of the character(s) or scene presently being displayed in the display device or monitor (e.g., a displayed image of a cartoon or animated feature character may be caused to quickly pose and hold the pose(s) for a preset period of time (e.g., 3 seconds or more in some cases) to allow a viewer of the displayed animation to capture a desirable or enhanced image).

We claim:

1. A method for controlling a robotic apparatus, comprising:
   with a motor controller, first operating a robotics assembly to animate the robotic apparatus;
   detecting an upcoming image capture of the robotic apparatus by a camera; and
   with the motor controller in response to the detecting of the upcoming image capture, second operating the robotics assembly to pose the robotic apparatus for the upcoming image capture.

2. The method of claim 1, wherein the detecting includes a sensor mounted on the robotic apparatus sensing a pre-flash of light from a red-eye effect reduction mechanism of the camera.

3. The method of claim 1, wherein the detecting includes a sensor mounted on the robotics apparatus sensing a range finder signal from a range finder of the camera.

4. The method of claim 1, wherein the detecting comprises capturing images of objects proximate to the robotic apparatus, processing the captured images with an object recognition module run by a processor to identify the camera, and, in response to the identification of the camera, generating a control signal with the processor initiating the second operating by the motor controller.

5. The method of claim 1, wherein the detecting comprises receiving with a wireless communication receiver provided on the robotic apparatus a wireless signal indicating the upcoming image capture by the camera.

6. The method of claim 1, wherein the second operating comprises interrupting the animation of the robotic apparatus to generate the pose.

7. The method of claim 6, wherein the second operating includes after the interrupting operating the robotics assembly to adjust at least one element of the robotic apparatus.

8. The method of claim 7, wherein the at least one element of the robotic apparatus is an eye and the operating to adjust the at least one element includes opening the eye.

9. The method of claim 1, wherein the second operating includes executing a photograph animation differing from an animation used in the first operating to generate the pose for the upcoming image capture.

10. The method of claim 9, wherein the robotic apparatus includes a face, wherein the motor controller includes a facial motor controller operable to animate eyes and move a mouth, and wherein the second operating includes operating the facial motor controller to move the eyes or the mouth to modify the face of the robotic apparatus for the upcoming image capture.

11. A robot, comprising:
   a robotics assembly;
   a motor controller controlling operations of the robotics assembly;
   a camera operations detector operating to detect camera operations indicating a camera operating within a time period to capture an image of the robot and to output, in response, a signal; and
   a microcontroller running a photography enhancement module to process the signal and, in response, to operate the motor controller to execute a photograph animation to place the robot in a pose during the time period.

12. The robot of claim 11, wherein the motor controller comprises a facial motor controller and the robotics assembly executes the photograph animation to open an eye of the robot and to set a position of a movable mouth.

13. The robot of claim 11, wherein the robot further includes memory storing a plurality of animations and wherein the photography enhancement module selects the photograph animation from the plurality of animations.

14. The robot of claim 11, wherein the camera operations detector includes a sensor mounted on the robot sensing a light output from a pre-flash mechanism of the camera.

15. The robot of claim 11, wherein the camera operations detector includes a sensor mounted on the robot sensing light from a range finder of the camera.

16. A control system for a display device, comprising:
   a detector transmitting a signal in response to detecting an upcoming image capture by a camera;
   memory storing a photo animation script for posing the display device for an image capture; and
   a microcontroller, in response to receiving the signal from the detector, sending the photo animation script to the display device for implementing the photo animation script by posing the display device for the upcoming image capture by the camera.

17. The system of claim 16, wherein the detector comprises a digital camera and the detecting comprises capturing an image of the camera or receiving light from a pre-flash mechanism or a range finder of the camera.

18. The system of claim 16, wherein the detector includes a phototransistor sensing light from a pre-flash mechanism or a range finder of the camera.

19. The system of claim 16, wherein the display device comprises a robotic assembly with a facial motor controller and wherein the signal is sent to the facial motor controller to trigger opening a pair of robotic eyes and moving a mouth into one of a plurality of facial expressions.

20. The system of claim 19, wherein the display device comprises a robotics assembly and the responding to the signal from the microcontroller includes executing a pose by interrupting a current animation being executed by the robotics assembly and holding the robotics assembly at an interrupted state for a preset period of time.

21. The system of claim 16 wherein the display device comprises a monitor displaying an animated image and wherein the responding to the photo animation script comprises updating the animated image or replacing the animated image with a still or video image.

* * * * *